US008784246B2

(12) United States Patent
Treichel et al.

(10) Patent No.: US 8,784,246 B2
(45) Date of Patent: Jul. 22, 2014

(54) SERIES DRIVETRAIN WITH CVT OUTPUT

(75) Inventors: Benjamin Treichel, Peoria, IL (US); Bryan Cochran, Peoria, IL (US); Min Li, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 215 days.

(21) Appl. No.: 13/325,970

(22) Filed: Dec. 14, 2011

(65) Prior Publication Data

US 2013/0157808 A1 Jun. 20, 2013

(51) Int. Cl.
*F16H 3/72* (2006.01)

(52) U.S. Cl.
USPC ................................ 475/5; 745/151; 745/153

(58) Field of Classification Search
USPC .............................. 475/5, 151, 153, 317, 900
See application file for complete search history.

(56) References Cited

U.S. PATENT DOCUMENTS 6,602,157 B2 8/2003 Kashiwase
6,886,648 B1 5/2005 Hata et al.
7,584,813 B2 9/2009 Yoshida
7,980,980 B2 7/2011 Rask et al.
2009/0124451 A1* 5/2009 Rask et al. ........................ 477/5
2010/0048338 A1* 2/2010 Si .................................... 475/5
2012/0316021 A1* 12/2012 Kim et al. ......................... 475/5

FOREIGN PATENT DOCUMENTS

CN 101804811 8/2010
JP 10081148 A 3/1998
JP 2001275206 A 10/2001
JP 2003319508 A 11/2003
JP 2008049819 A 3/2008
JP 2009154808 A 7/2009

* cited by examiner

*Primary Examiner* — Edwin A Young
(74) *Attorney, Agent, or Firm* — Miller, Matthias & Hull

(57) ABSTRACT

An electric drive system for driving a machine includes first and second electric drive motors linked to sun and ring gears respectively of a planetary output stage, and a ring brake associated with the ring gear to maintain the ring gear in a locked position. The carrier drives a fixed gear series drive train. In a first regime of operation corresponding to a first range of machine speeds, a controller employs the ring brake to brake the ring gear, and actuates only the first electric drive motor at a speed sufficient to yield the desired machine speed. In a second regime, corresponding to a second range of machine speeds, the controller drives the first electric drive motor at maximum speed, releases the ring brake, and drives the second electric drive motor so as to yield the desired machine speed.

19 Claims, 4 Drawing Sheets

SERIES DRIVETRAIN WITH CVT OUTPUT

TECHNICAL FIELD

This patent disclosure relates generally to transmission systems for propulsion and, more particularly to a multi-motor series drive train system having an effective speed range greater than a single motor system without requiring range shifting and without the inertial artifacts associated with shifting processes.

BACKGROUND

While electric drive trains comprise an increasing share of drive trains used in industrial material manipulation and transportation, such drive trains have not yet been able to provide the full simplification and ease of use that it was once thought they would provide. For example, although the speed range of an electric motor may differ from, and in some cases exceed, the speed range of a counterpart internal combustion engine, electric motors do not typically have sufficient speed and torque range to allow continuous operation from machine stop to machine full speed.

As such, electric drive machines generally include a shiftable transmission much like their internal combustion driven counterparts to allow the electric drive motor to operate within its specified speed range while also allowing the machine to have a full range of output/driving speed. Thus, for example, a low speed range may provide operation between a stopped state and some intermediate speed state, while a high speed range, entered at or near the top speed of the low range state, would provide enough speed for increasingly higher speeds, e.g., for extended transport runs.

However, for all the benefits that they provide, multi-range shiftable transmissions also entail certain significant shortcomings. For example, as the transmission is shifted between ranges, inertial problems may occur and must be accounted for in the transmission design and operation. Moreover, in conjunction with low range operation, sufficiently low gearing and sufficiently large inverters must be provided to allow for the required machine stall torque. Overcoming these and other problems can lead to significant costs and complexities, offsetting, at least to some extent, the many benefits of the electric drive system.

It will be appreciated that this background description has been created by the inventors to aid the reader, and is not to be taken as a reference to prior art nor as an indication that any of the indicated problems were themselves appreciated in the art.

SUMMARY

In overview, the described system provides in one embodiment a series electric drive train for driving a ground engaging mechanism of a machine. The series electric drive train includes a first electric drive motor having a first motor output, a second electric drive motor having a second motor output, and a planetary gear set having a sun gear, a carrier, and a ring gear. In this embodiment, the sun gear is rotationally fixed to the first motor output and the ring gear is rotationally fixed to the second motor output. The carrier provides a rotational output of the planetary gear set. A ring brake associated with the ring gear serves to stop the ring gear. A fixed gear drive links the rotational output of the planetary gear set to the ground engaging mechanism.

In another embodiment, an electric drive system for propelling a machine is provided. The electric drive system includes first and second electric drive motors linked directly to a sun gear and ring gear respectively of a planetary output stage for driving a series drive train. The output of the planetary output stage, is directly linked to the planetary carrier and a ring brake is included for maintaining the ring gear in a locked state. An electrical energy supply system supplies electrical power to the first and second electric drive motors. A controller is programmed to operate the first and second electric drive motors and the ring brake in two regimes of operation to provide a desired machine speed. In the first regime of operation corresponding to a first range of machine speeds, the controller operates the ring brake to brake the ring gear, and actuates only the first electric drive motor at a speed sufficient to yield the desired machine speed. In the second regime of operation, corresponding to a second range of machine speeds higher than the first range of machine speeds, the controller drives the first electric drive motor at a fixed speed, operates the ring brake to release the ring gear, and drives the second electric drive motor at a speed sufficient to yield the desired machine speed.

In yet another embodiment, a method is provided for operating an electrically driven output stage to a series drive train to power a machine. The electrically driven output stage with respect to which the method is practiced includes a planetary gear set having a sun gear, ring gear, and carrier, a ring brake operable to maintain the ring gear in a locked state, a first electric drive motor rotationally linked to the sun gear, and a second electric drive motor rotationally linked to the ring gear. The carrier is rotationally linked to the series drive train. The method includes receiving an indication of a desired machine speed and operating the first electric drive motor, second electric drive motor, and ring brake to yield a machine speed matching the desired machine speed. This is done by operating the ring brake to stop the ring gear and the second electric drive motor, and actuating the first electric drive motor at a speed sufficient to yield the desired machine speed when the desired machine speed is below a predetermined threshold speed. When the desired machine speed is at least as high as the predetermined threshold speed, the operation involves operating the ring brake to release the ring gear, operating the first electric drive motor at a predetermined fixed speed, and actuating the second electric drive motor at a speed sufficient to yield the desired machine speed.

Further and alternative aspects and features of the disclosed principles will be appreciated from the following detailed description and the accompanying drawings, of which:

DETAILED DESCRIPTION

This disclosure relates to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine for a variety of tasks, including, for example, loading, compacting, lifting, brushing, and may include, for example, buckets, compactors, forked lifting devices, brushes, grapples, cutters, shears, blades, breakers/hammers, augers, and others.

In overview, the described system provides a series drive train with a CVT output that eliminates multi-range gear sets requiring shifting to achieve a full machine speed range. A driving inverter is sized in an embodiment to account for the reduced power requirements of the system. In particular, the arrangement of the system allows the use of a minimized inverter that needs to support the stall current of only one motor, since there is no situation requiring driving of two stalled motors at once. Moreover, the staging of motor response to provide a single continuous output speed range enables the machine to operate throughout its entire speed range without shifting. This in turn eliminates the inertial problems and other complexities associated with shifting systems.

Figure 1:
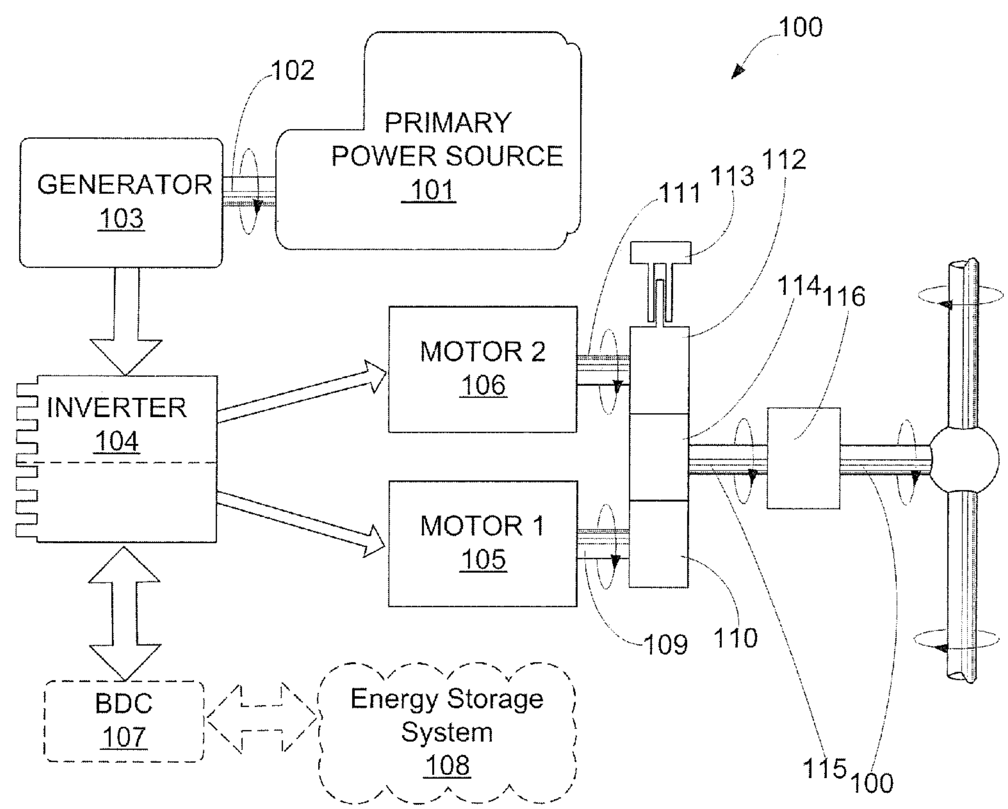
FIG. 1 is a schematic system diagram of an electric drive system in keeping with embodiments of the disclosed principles.

As summarized in the brief description of drawings above, FIG. 1 is a schematic system diagram of an electric drive system 100 in keeping with embodiments of the disclosed principles. The electric drive system 100 includes a primary power source 101, which may be an engine, e.g., a diesel, propane or gasoline driven internal combustion engine. The primary power source 101 supplies a rotational output 102 to drive an electrical generator 103 of sufficient size to provide drive power, e.g., a 400 kW generator for operation in a large wheel loader or similarly sized machine.

The electrical power output of the electrical generator 103 is provided to an inverter 104. The inverter 104 serves to rectify and optionally smooth the AC (alternating current) output of the electrical generator 103. Thus, the output of the inverter 104 is a DC (direct current) power output suitable for use in machine drive or power storage. To these ends, the electrical power output of the inverter 104 is provided for selective actuation of a first drive motor 105 and a second drive motor 106, and is also provided to a battery charge/discharge controller 107.

The optional battery charge/discharge controller 107 is linked to, and controls the charging and discharging of, an energy storage system 108, e.g., a battery bank, capacitor bank, etc. In this way, the energy storage system 108 may be charged using excess power from the electrical generator 103, i.e., using power not consumed by the first drive motor 105 and second drive motor 106. Similarly, the energy storage system 108 may supply electrical power to transiently alleviate a power deficit in the event that the first drive motor 105 and second drive motor 106 require more power than is instantaneously available from the electrical generator 103. It will be appreciated that the electrical generator 103 may optionally also provide power to electrical systems, components and/or devices other than the first drive motor 105 and second drive motor 106. For example, a machine may have controllers, signals, lighting, communications gear, and other equipment that require a source of electrical power for operation.

The first drive motor 105 and second drive motor 106 are mechanically linked as inputs to a planetary gear set following the motors. In particular, the first drive motor 105 provides rotational power at a first output 109 as an input to a sun gear 110 of the planetary gear set. Similarly, the second drive motor 106 provides rotational power at a second output 111 as an input to a ring gear 112 of the planetary gear set. A ring brake 113 is also associated with the ring gear 112. In an embodiment, the ring brake 113 is normally on, such that actuation of the ring brake 113 allows the ring gear 112 to move. In an optional embodiment of the invention, partial actuation of the ring brake 113 may be used to resist movement of the ring gear 112 in relation to the degree of actuation.

A carrier 114 of the planetary gear set provides a rotational output 115 to a fixed gear reduction drive 116. Thus, the rotational speed and torque characteristics of the rotational output 115 are set by a combination of factors including any actuation of the ring brake 113 as well as the operation of the first drive motor 105 and the second drive motor 106. The manner in which these variables are manipulated to provide a desired output without shifting will be discussed below after a brief discussion of the system control architecture.

Figure 2:
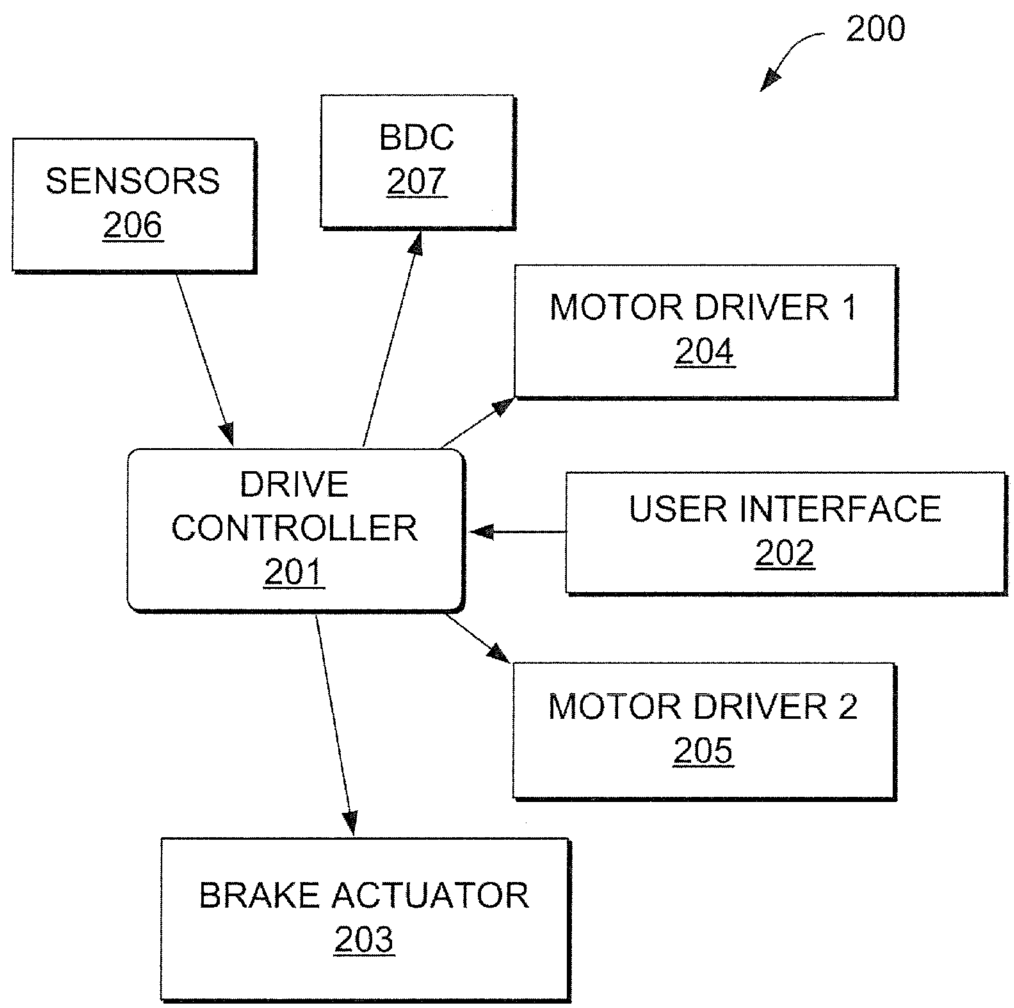
FIG. 2 is a schematic control architecture diagram identifying the control and data exchange paths and components employed to control a drive train system such as that shown in FIG. 1.

Turning now to FIG. 2, this figure shows a schematic control architecture diagram identifying the control and data exchange paths and components employed to control a drive train system such as that shown in FIG. 1. The illustrated control architecture 200 includes a drive controller 201. The drive controller 201 may include, be part of, or be separate from other machine controllers such as an ECM (engine control module). Regardless, only those paths and relationships employed for series drive control as described above are included in the figure. It will be understood that the drive controller 201 may additionally control other components and may receive/provide additional inputs/outputs other than those shown in the figure.

A user interface 202 provides an input to the drive controller 201. The user interface 202 input may include a drive command having a drive command level, wherein the drive command level indicates a desired machine torque and/or machine speed. Thus, for example, the user interface reflects a user's intent to control the machine movement, e.g., the direction (forward or reverse) and speed of the machine. Various systems associated with user interface 202 and being usable to receive and transmit user commands include levers, buttons, touch screen elements, pedals, and the like.

Having received a user command from the user interface 202, the drive controller 201 attempts to implement the command via actuation or deactuation of the ring brake 113 (FIG. 1) based on a control signal from the drive controller 201 to the brake actuator 203. In addition, the drive controller 201 employs selective actuation of the first drive motor (FIG. 1) and second drive motor (FIG. 1) via control signals to motor driver 1 (204) and motor driver 2 (205) respectively.

In order to calculate the necessary control signals for the brake actuator 203, motor driver 1 (204) and motor driver 2 (205), the drive controller 201 evaluates not only the user command but also the data provided by certain system sensors 206. In an embodiment, the system sensors 206 include one or more state of charge sensors that reflect the state of charge of the energy storage system 108 (FIG. 1), available power from the electrical generator 103 (FIG. 1), and machine speed.

Depending upon the desired machine speed, the drive controller 201 will operate brake actuator 203, motor driver 1 (204) and motor driver 2 (205) in one of two regimes. In the first regime, below a first predetermined machine speed, the motor driver 2 (205) is actuated such that the second drive motor 106 is powered off, the brake actuator 203 is controlled such that the brake 113 stops the ring gear 112, and motor driver 1 (204) is actuated at a speed so as to have the first drive motor 105 provide the sole power to propel the machine at the desired speed.

As noted above, in an embodiment, the ring brake 113 is normally on, such that actuation serves to release the brake 113. In a further optional aspect of this embodiment, a passive (non-powered) brake-on mode is used. In addition to requiring less energy since energy is only required to take the brake off, this default also aids in bringing the machine to a stop upon loss of power.

In the second regime, at or above the first predetermined machine speed, the motor driver 2 (205) is actuated such that the second drive motor 106 is powered on, the brake actuator 203 is actuated such that the brake 113 is released, i.e., so as to allow ring gear 112 to move freely, and motor driver 1 (204) is actuated such that the first drive motor 105 is driven at its highest allowed speed. In this regime or mode of operation, the second drive motor 106 controls the exact speed of the machine between the first predetermined machine speed and the maximum attainable machine speed.

It will be appreciated that the first predetermined machine speed may be set based on the maximum speed of the first drive motor 105 (i.e., the machine speed resulting from driving the first drive motor at its maximum allowable speed with the second drive motor 106 and ring gear 112 stationary). Alternatively, a slightly lower speed may be chosen as the first predetermined machine speed if it is not desirable to routinely drive the first drive motor at its maximum allowable speed.

The primary mode of operation described above with respect to the first drive motor 105 and the second drive motor 106 uses only the first drive motor 105 at low speeds until a certain speed is reached, and thereafter generates all machine acceleration using only the second drive motor 106. The ring brake 113 serves to isolate the second drive motor 106 during low speed operation as well as to provide a reactive torque to allow the first drive motor 105 to propel the machine.

In order to provide a final drive ratio allowing appropriate speeds and torques, the ratios provided by the planetary gear set in the various regimes may be modified by a final drive ratio provided by the fixed gear reduction drive 116. In this way, the same power system may be used in a heavier and slower machine as is used in a lighter faster machine by changing the ratio provided by the fixed gear reduction drive 116, the 'e-ratio' of the planetary system, or both.

In an embodiment, as noted above, it is possible for the selected machine speed to require more power than is instantaneously available from the electrical generator 103. In such a situation, the drive controller 201 may control the BDC 207 (107) to release sufficient power from the energy storage system 108 to supply the deficit in available electrical power. This may occur when an obstruction or change in machine operation causes a spike in electrical power requirements, at a range of operation where it is not possible or desirable to increase the power output of the primary power source 101, and hence not possible or desirable to increase the output of the electrical generator 103. The limits on the operation of the primary power source 101 may derive from structural limits or from other limits such as engine emissions limitations.

Figure 3:
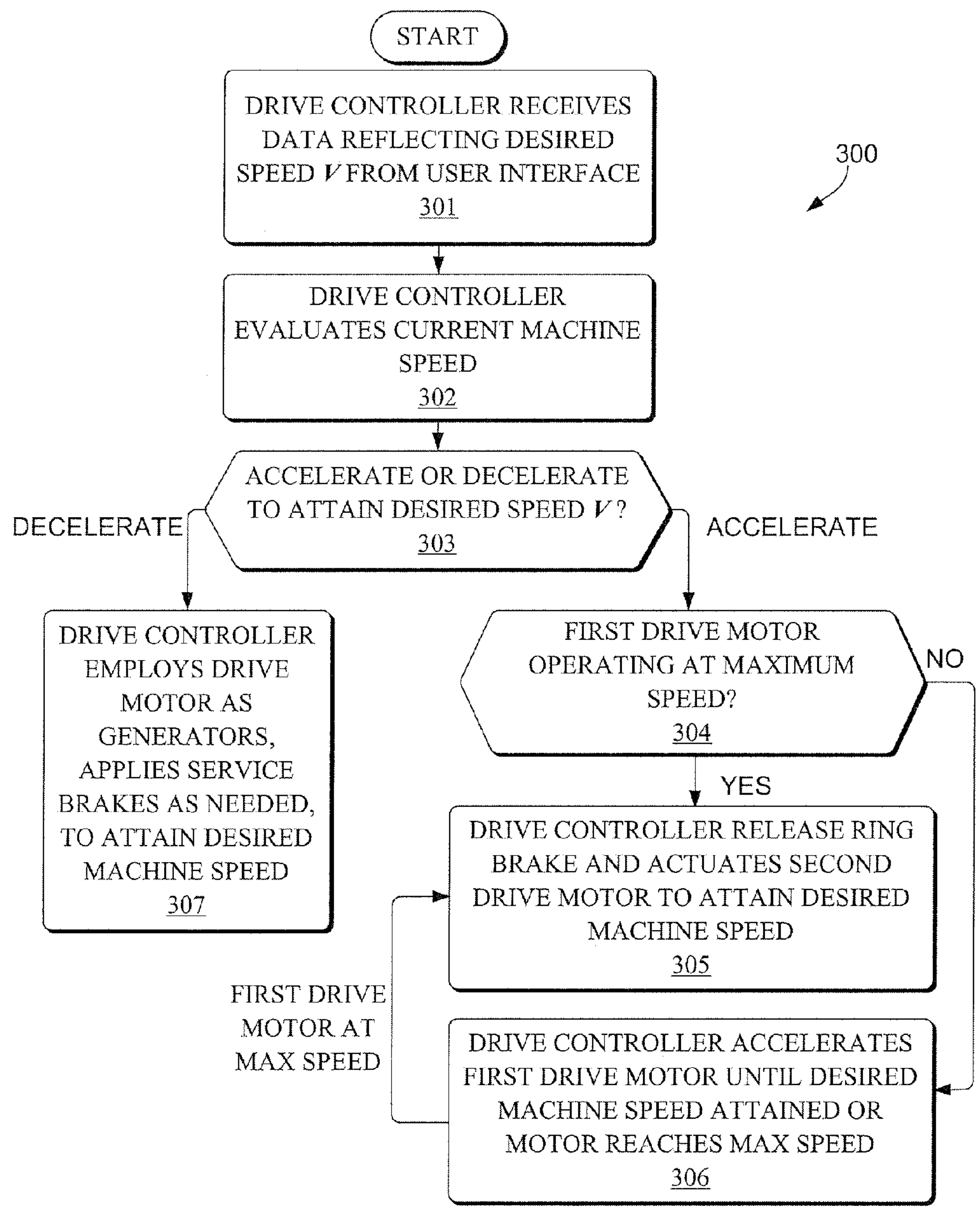
FIG. 3 is a flow chart illustrating a process flow for attaining a desired speed using an apparatus as shown in FIGS. 1 and 2.

A method of operation of the described system according to an embodiment may be better understood from the flow chart of FIG. 3. In particular, FIG. 3 illustrates a process flow 300 for attaining a desired speed using an apparatus as shown in FIGS. 1 and 2. The illustrated process may be executed by the drive controller 201, ECM (not shown) or other electronic control architecture depending upon implementation preference. Moreover, the illustrated steps or stages are the result of a computerized execution of computer-readable instructions (e.g., computer code, programs, and associated permanent data as needed) stored on a physical non-transitory computer-readable medium. Such media include, for example, optical discs, flash drives, magnetic media, and so on.

At stage 301 of the process flow 300, the drive controller 201 reads or receives data reflecting a desired speed v from the user interface 202. This data may be retrieved at periodic intervals, e.g., every controller cycle, or may be pushed to the drive controller 201 by the user interface 202 only when the data has changed. In the latter embodiment, the drive controller 201 will assume that the data is unchanged in the absence of an update.

At stage 302 of the process flow 300, the drive controller 201 evaluates current machine speed, e.g., via data received from machine speed sensors. With the desired and current machine speeds known, the drive controller 201 determines at stage 303 whether the machine needs to be accelerated or decelerated to achieve the desired machine speed. In the event that it is determined at stage 303 that the machine must be accelerated to attain the desired speed, the drive controller 201 determines at stage 304 whether the first drive motor 105 is operating at its maximum allowed speed (i.e., the maximum speed that the motor is permitted to have either by its design or by a limitation imposed by the system designer on the motor speed).

If it is determined at stage 304 that the first drive motor 105 is operating at its maximum allowed speed, the drive controller 201 releases the ring brake 113, e.g., by powering it if it is biased on when not powered, and actuates the second drive motor 106 at stage 305 until the desired machine speed is reached or until the second drive motor 106 is operating at its maximum allowed speed.

If it is instead determined at stage 304 that the first drive motor 105 is not yet operating at its maximum allowed speed, the drive controller 201 accelerates the first drive motor 105 at stage 306 until either its maximum allowed speed is reached or the desired machine speed is attained. In the event that the maximum allowed speed for the first drive motor 105 is reached before the desired machine speed in attained, the process 300 returns to stage 305 for actuation of the second drive motor 106.

Returning to stage 303, if it is instead determined at this stage that the machine must be decelerated rather than accelerated to attain the desired speed, the drive controller 201 may use a combination of machine service brakes and the resistance of the first drive motor 105 and second drive motor 106 to slow the machine. In particular, in an embodiment, the drive controller 201 employs the first drive motor 105 and second drive motor 106 as generators at stage 307, with the resistance of the motors slowing the machine and the electrical energy thus generated being directed into the energy storage system 108 for storage and later use. If greater deceleration is needed, the drive controller 102 may activate the machine service brakes as well at this stage until the desired speed is attained.

It will be appreciated that the ring brake 113 may be used as well during deceleration. However, the use of the ring brake 113 will slow the second drive motor 106 while increasing the reactive torque tending to accelerate the first drive motor 105. Thus, care should be taken in such a situation not to exceed the speed limitations of the first drive motor 105.

Figure 4:
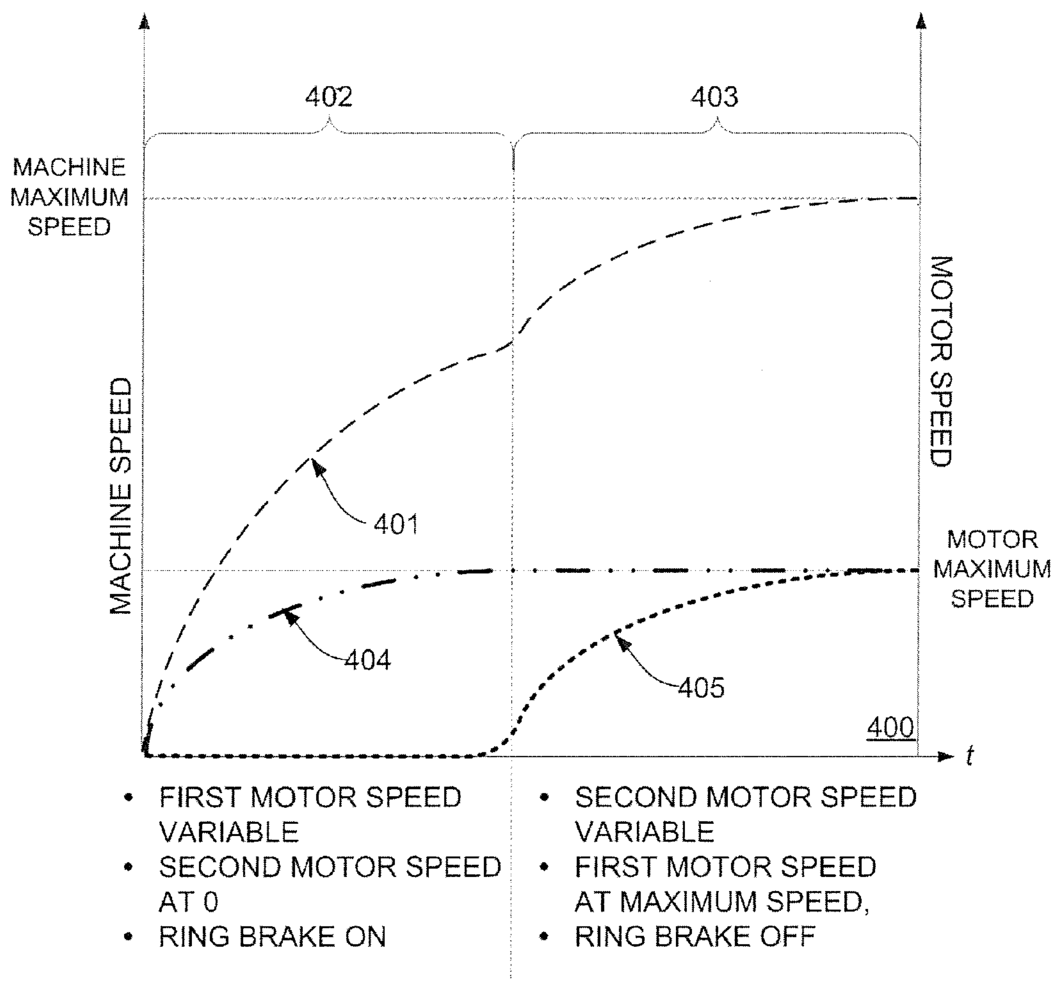
FIG. 4 is a dual axis data plot showing idealized behavior of a machine and motors according to the described principles during an acceleration cycle.

In keeping with the apparatus and method exemplified above, FIG. 4 is a dual axis data plot showing the idealized behavior of the machine and the motors during an acceleration cycle. In the illustrated plot 400, the machine speed 401, measured on the left vertical axis, and first motor speed 404 and second motor speed 405, measured on the right vertical axis, are plotted as a function of time during acceleration. The dimension space covered by the illustrated plot 400 is divided into a first regime 402 and a second regime 403.

In the first regime 402, the first motor speed 404 (corresponding to first drive motor 105) is variable and increasing during acceleration, while the second motor speed 405 (corresponding to second drive motor 106) is fixed at zero (0). Moreover, in the first regime 402, the ring brake 113 is applied (e.g., unpowered if biased on), braking the associated ring gear 112. Thus, in the first regime 402, the first drive motor 105 determines machine speed, with the second drive motor 106 being effectively braked and thus providing only reactive torque. Once the first motor speed 404 reaches the maximum allowed value, the drive operation transitions to the second regime 403.

In the second regime 403, the first motor speed 404 continues at the maximum allowed value, while the ring brake 113 is released and the second drive motor 106 is accelerated from zero speed. Thus, in the second regime 403, the second drive motor 106 is responsible for setting machine speed. When the second motor speed 405 reaches its maximum allowed value, the machine speed will also be at its maximum.

With respect to motor torque requirements, the available electrical power is only used in the first regime 402 to provide current to the first drive motor 105. Thus, while the stall torque requirements relative to the first drive motor 105 must be met in the first regime 402, the second drive motor 106 does not consume electrical power in this regime. Similarly, in the second regime 403, the first drive motor 105 is simply maintained at maximum speed, while the stall torque requirements relative to the second drive motor 106 are met.

Thus, using a planetary gear set as an output stage to a series drive train to eliminate a multispeed transmission as described above also allows the use of inexpensive and identical drive motors if desired. In other words, in the illustrated system, neither drive motor is required to be of a higher output capacity than the other. This feature is also useful if it is desired to rotate motors between the first and second positions to ensure even wear. For example, it is anticipated that the first drive motor 105 alone may be used for a machine loading cycle. Moreover, although the foregoing describes the use of the first drive motor 105 for low speed operations, it is also possible to fix the first drive motor 105 at low machine speeds and use the second drive motor 106 for low speed operations at a slightly different effective gear ratio without shifting. Thus, while the motors may be identical, it is also likely that one may be used more often than the other, increasing the benefits of rotating the motors between positions.

Industrial Applicability

The described principles are applicable to electric drive machines requiring a drive train to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earthmoving machine, such as a wheel loader, excavator, dump truck, backhoe, motor grader, material handler or the like.

Within such applications, the described principles apply to motive machine operations including during loading, carrying, empty transporting etc. The described system and method allow the use of a simple and compact, non-shifted transmission for powering electric movement of the machine. The apparatus employs two electric motors, which may be, but need not be, identical in capacity.

The two electric motors are interfaced to drive a sun and ring gear of a planetary gear set that outputs to a final drive train, which may include a further fixed gear reduction. During operation, the first of the two electric motors is used for low speed operations, with the second motor being used to provide additional machine speed once the first motor has reached its maximum speed. Thus, some operations, such as a wheel loader truck loading cycle, may be accomplished using only one motor, yet without requiring shifting to reach higher machine speeds when needed.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

We claim:

1. A series electric drive train for driving a ground engaging mechanism of a machine, the series electric drive train comprising:

a first electric drive motor having a first motor output;

a second electric drive motor having a second motor output;

an electrical generator for providing electrical power to the first electric drive motor and the second electric drive motor;

a planetary gear set having a sun gear, a carrier, and a ring gear, the sun gear being rotationally fixed to the first motor output and the ring gear being rotationally fixed to the second motor output, the carrier providing a rotational output of the planetary gear set;

a ring brake associated with the ring gear to maintain the ring gear in a locked position; and a fixed gear drive linking the rotational output of the planetary gear set to the ground engaging mechanism.

2. The series electric drive train according to claim 1, wherein the fixed gear drive linking the rotational output of the planetary gear set to the ground engaging mechanism is a reduction gear set.

3. The series electric drive train according to claim 1, wherein the first electric drive motor and the second electric drive motor are of essentially matching power capacities.

4. The series electric drive train according to claim 1, wherein the electrical generator is linked to, and driven by, a prime power source.

5. The series electric drive train according to claim 1, further including an energy storage system for providing electrical power to the first electric drive motor and the second electric drive motor.

6. The series electric drive train according to claim 5, wherein the energy storage system is further configured to receive electrical power from the first electric drive motor and the second electric drive motor during machine deceleration.

7. An electric drive system for propelling a machine, the electric drive system comprising:

first and second electric drive motors linked directly to a sun gear and ring gear respectively of a planetary output stage for driving a series drive train, an output of the planetary output stage being directly linked to a carrier of the planetary output stage, the planetary output stage including a ring brake for selectively braking and releasing the ring gear;

an electrical energy supply system for supplying electrical power to the first and second electric drive motors; and a controller programmed to operate the first and second electric drive motors and the ring brake in two regimes of operation to provide a desired machine speed, wherein in the first regime of operation, corresponding to a first range of machine speeds, the controller actuates the ring brake to brake the ring gear, and actuates only the first electric drive motor at a speed sufficient to yield the desired machine speed, and wherein in the second regime of operation, corresponding to a second range of machine speeds higher than the first range of machine speeds, the controller drives the first electric drive motor at a fixed speed, actuates the ring brake to release the ring gear, and drives the second electric drive motor at a speed sufficient to yield the desired machine speed.

8. The electric drive system according to claim 7, wherein the electrical energy supply system includes one of an electrical generator and a connection to grid power.

9. The electric drive system according to claim 8, wherein the electrical energy supply system includes an electrical generator and wherein the electrical generator is driven by an internal combustion engine.

10. The electric drive system according to claim 7, wherein the electrical energy supply system includes an energy storage system.

11. The electric drive system according to claim 10, wherein the energy storage system includes a battery bank.

12. The electric drive system according to claim 10, wherein the energy storage system includes a capacitor bank.

13. The electric drive system according to claim 7, wherein driving the first electric drive motor at a fixed speed includes driving the first electric drive motor at its maximum allowable speed.

14. The electric drive system according to claim 7, wherein the controller is further programmed to determine the desired machine speed via a user interface.

15. A method for operating, an electrically driven output stage to a series drive train to power a machine, the electrically driven output stage including a planetary gear set having a sun gear, a ring gear, and a carrier, a ring brake associated with the ring gear to maintain the ring gear in a locked position, a first electric drive motor rotationally linked to the sun gear, a second electric drive motor rotationally linked to the ring gear, and the carrier being rotationally linked to the series drive train, the method comprising:

receiving an indication of a desired machine speed;

operating the first electric drive motor, second electric drive motor, and ring brake to yield a machine speed matching the desired machine speed by:

employing the ring brake to stop the ring gear and the second electric drive motor, and actuating the first electric drive motor at a speed sufficient to yield the desired machine speed when the desired machine speed is below a predetermined threshold speed; and employing the ring brake to release the ring gear, operating the first electric drive motor at a predetermined fixed speed, and actuating the second electric drive motor at a speed sufficient to yield the desired machine speed when the desired machine speed is at least as high as the predetermined threshold speed.

16. The method for operating an electrically driven output stage to a series drive train according to claim 15, wherein the predetermined fixed speed is a maximum allowable speed of the first electric drive motor.

17. The method for operating an electrically driven output stage to a series drive train according to claim 15, wherein receiving an indication of a desired machine speed includes determining the desired machine speed via a user interface of the machine.

18. The method for operating an electrically driven output stage to a series drive train according to claim 15, wherein the first electric drive motor and the second electric drive motor are of substantially the same power capacity.

19. The method for operating an electrically driven output stage to a series drive train according to claim 15, wherein the machine includes a service brake, and wherein operating the first electric drive motor, second electric drive motor, and ring brake to yield a machine speed matching the desired machine speed further comprises applying the service brake of the machine.

* * * * *